(12) United States Patent
Schmale

(10) Patent No.: US 6,481,801 B1
(45) Date of Patent: Nov. 19, 2002

(54) SEAT PADDINGS FOR VEHICLE SEATS

(75) Inventor: Gerhard Schmale, Hückeswagen (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/666,702

(22) Filed: Sep. 21, 2000

(30) Foreign Application Priority Data

Sep. 21, 1999 (DE) .................................... 299 16 636 U
Feb. 11, 2000 (DE) .................................... 200 02 447 U

(51) Int. Cl.⁷ ................................................ A47C 7/74
(52) U.S. Cl. ........................... 297/452.27; 297/452.26; 297/180.14; 297/180.12
(58) Field of Search ..................... 297/180.14, 180.13, 297/180.12, 452.26, 452.21, 452.27; 5/653

(56) References Cited

U.S. PATENT DOCUMENTS

| | | | |
|---|---|---|---|
| 3,987,507 A | * 10/1976 | Hall ....................... | 297/DIG. 1 |
| 5,163,737 A | * 11/1992 | Navach et al. ......... | 297/452.25 |
| 5,522,106 A | * 6/1996 | Harrison et al. ....... | 297/452.25 |
| 5,544,942 A | 8/1996 | Vu Khac et al. | |
| 5,597,200 A | * 1/1997 | Gregory et al. ....... | 297/180.13 |
| 5,626,386 A | 5/1997 | Lush | |
| 5,927,817 A | 7/1999 | Ekman et al. | |
| 5,934,748 A | * 8/1999 | Faust et al. ............. | 297/180.12 |
| 6,003,950 A | * 12/1999 | Larsson .................. | 297/452.42 |
| 6,179,706 B1 | * 1/2001 | Yoshinori et al. ... | 297/180.14 X |
| 6,196,627 B1 | * 3/2001 | Faust et al. ............. | 297/180.14 |
| 6,206,465 B1 | * 3/2001 | Faust et al. ............. | 297/180.14 |
| 6,224,150 B1 | * 5/2001 | Eskin et al. ............. | 297/180.1 |
| 6,277,023 B1 | * 8/2001 | Schwarz ............... | 297/180.14 X |

FOREIGN PATENT DOCUMENTS

| | | |
|---|---|---|
| DE | 40 01 207 A1 | 7/1991 |
| EP | 0 345 806 A2 | 12/1989 |
| FR | 2 686 299 | 7/1993 |

OTHER PUBLICATIONS

European Search Report for German Utility Model Application 200 02 447.7.

* cited by examiner

Primary Examiner—Laura A. Callo
Assistant Examiner—Brian E. Glessner
(74) Attorney, Agent, or Firm—Foley & Lardner

(57) ABSTRACT

The present application pertains to a seat pad particularly for motor vehicles seats, with a core portion made of expanded plastics material. The upper side of the core portion facing the seat surface is provided with channel-like grooves, so that the geometry of the remaining core portion allows an optimum distribution of the seat pressure because of the good adaptation to the human anatomy.

8 Claims, 3 Drawing Sheets

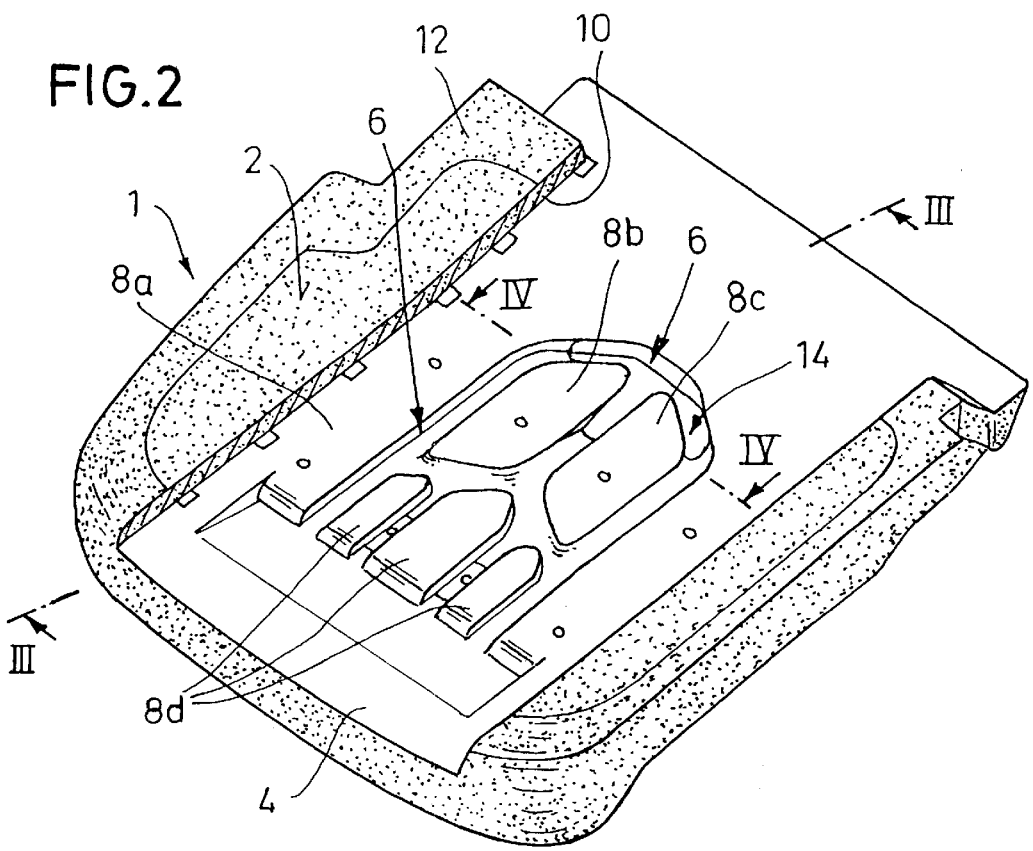
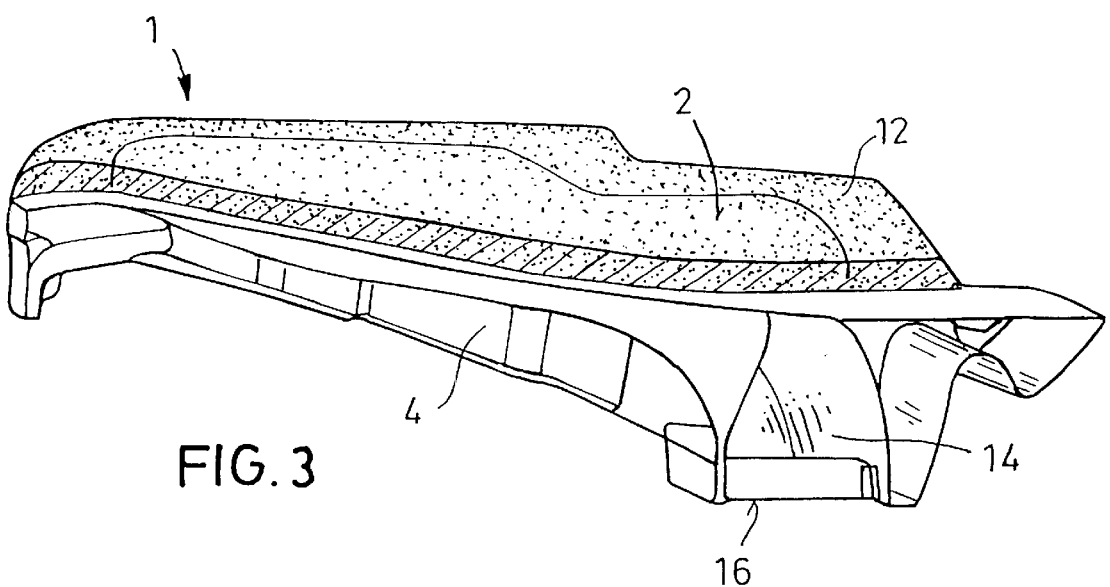

US 6,481,801 B1

SEAT PADDINGS FOR VEHICLE SEATS

TECHNICAL FIELD OF THE INVENTION

The subject of this invention is a seat padding, particularly for vehicle seats, with at least one core part made of an elastic plastic foam.

BACKGROUND

Seat paddings of this type are presently often used for vehicle seats. The core part generally consists of a polyurethane (PUR cold foam) molding.

For seat paddings of high-end vehicles, moldings from a mixture of natural fibers such as coconut fiber, animal hair, etc. are also used, the fibers being treated with binding agents, particularly latex, and formed to a cushion part. Such a fiber/binding-agent material is also known as "rubber hair".

The two known types of seat paddings have advantages and disadvantages. While plastic moldings are light, but little permeable for air, cushion parts from rubber hair have a considerably higher weight, but can be easily vented due to their high air permeability.

For seat paddings it is furthermore desired to shape certain zones of the seat area differently to support different seat pressures. For example, a higher seat pressure must be supported in the area of the human ischial tuberosities than, say, in the area of the thighs. Using a support area that is too small, however, would impair the seat user's comfort because a high seat pressure may negatively affect the blood supply to the legs. A bad seat pressure distribution may often lead to numb legs. To avoid these problems, cushion parts made of so-called two-zone foam have also been introduced. These cushion parts are characterized by harder or softer foam in the appropriate partial areas. However, the production of such cushion parts is difficult and cost-intensive, and often the desired effect is not achieved because the fine adjustment of the seat pressure distribution requires extremely high effort.

SUMMARY OF THE INVENTION

The objective of this invention is to create a cushion part of the type as described above, whose seating area can be adjusted highly accurately to the desired seating comfort in a simple and inexpensive way.

The invention achieves this by channel-like grooves on the top side of the core part facing a seat surface, with the core part entirely made of one foam material only. These grooves running through the seat surface cause zonal weakenings, and by designing a certain layout of these grooves, the intermediate, remaining partial surfaces of the core part can be given different supporting strengths. This means that partial surfaces with different surface areas can be created. Small, closely adjacent partial surfaces produce relatively soft part sections while larger partial surfaces produce an overall harder section. This provides a simple means to shape the entire seat surface according to the pressure conditions required. This results in a good, ergonomic body support, while at the same time providing a soft and comfortable seating experience. Mainly the channel-like grooves and the resulting remaining partial surfaces of the core part are shaped according to the human anatomy in the seating area to achieve an optimal seat pressure distribution.

The invention enables in principle even an individual adjustment of each seat to the seating requirements of each user by giving the channel-like grooves a preferably empirically determined layout, which is identical for all users, and filling the grooves at least partly with inserts. These inserts preferably consist of a material that is comparatively harder than the core part. The inserts pass the seat pressure on to the adjacent padding material.

To achieve a smooth transition of the pressure distribution from relatively harder zones to relatively softer zones, it is advantageous to cover the grooved core part surface facing the seat user with a relatively thin overlay. This overlay preferably consists of the above-mentioned "rubber hair".

Another advantage of this invention is the considerably improved venting condition, because the channel-like grooves allow at least a partial air circulation. Especially in combination with the rubber hair overlay, it could be shown that the highly air-permeable overlay allows an excellent removal of humidity. The continuous movements of the seat user on the seat padding during a ride cause a pump effect producing an airflow in the channel-like groove system of the core part transporting the humid air—mainly through specially provided, vertical openings in the foam cushion part—to the outside without requiring the use of additional fans.

However, the invention also allows an additional active ventilation by at least one fan. The fan should then preferably be located below the seat padding providing a vertical airflow with a suction or pressure effect.

Additional advantageous design features are contained in the sub-claims and the description below.

BRIEF DESCRIPTION OF THE DRAWINGS

The design samples illustrated in the drawing explain the invention in detail. The figures show the following views:

FIG. 2 shows a similar view as FIG. 1 of a second, preferred design of the seat padding.

FIG. 3 shows a longitudinal section through the cutting plane III—III indicated in FIG. 2.

DETAILED DESCRIPTION OF THE PREFERRED EMBODIMENT

Figure 1:
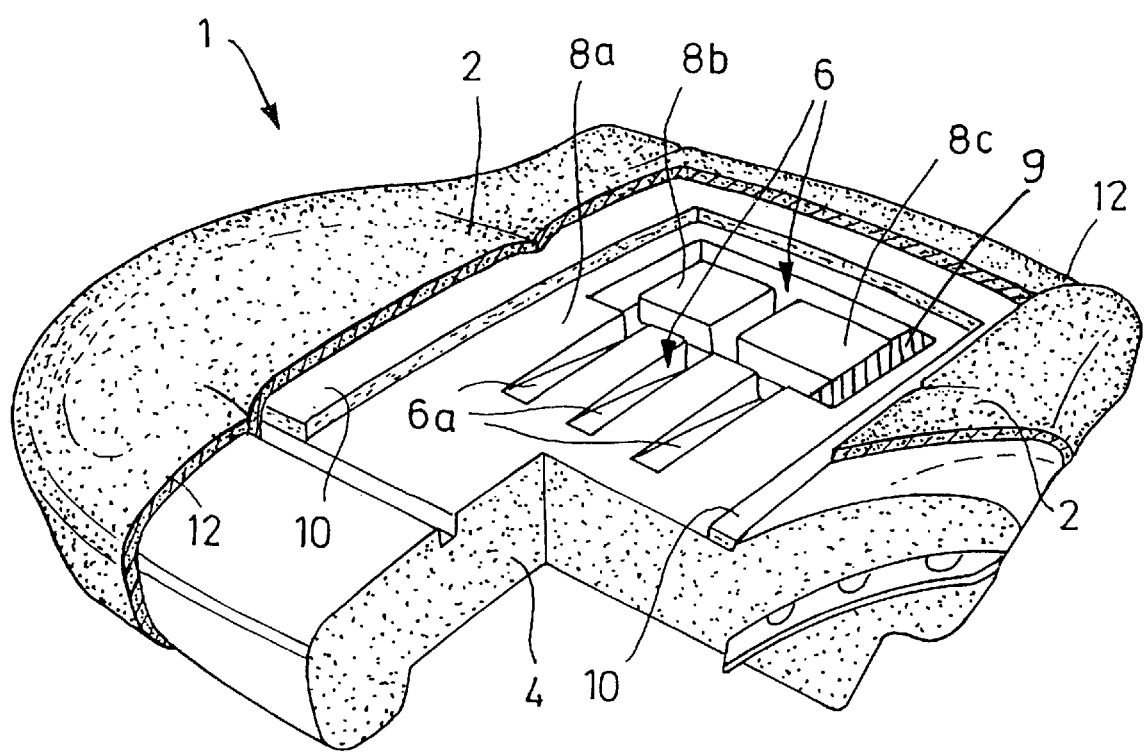
FIG. 1 shows a perspective sectional view of an initial design sample of the seat padding as specified by the invention.

The illustrated seat padding 1 is especially intended as the bottom part of a vehicle seat, however it can also be used for the backrest of a vehicle seat. The seat padding 1 has a top seat surface 2 featuring an ergonomic relief. Inside the seat padding 1 is a core part 4 made of an elastic plastic foam.

As specified by the invention, the core part 4 has channel-like grooves on its top side facing the seat surface 2. The partial surfaces 8a, 8b, 8c, and 8d between the grooves 6 are arranged by an appropriate layout of the grooves as specified by the invention such that they adapt themselves to the human anatomy in the seating area providing an optimal seat pressure distribution.

The depicted design samples show two partial surfaces 8b and 8c that are completely enclosed by channel-like grooves 6 and which serve as supporting elements for the human ischial tuberosities. Therefore, the two partial surfaces 8b and 8c are located side by side when viewed in traveling direction. The grooves 6 in this seat section mainly have the shape of the number "8", e.g., according to FIG. 1, the shape of the rectangular "8" of a digital display (so-called seven-segment display). Therefore, the partial surfaces 8b and 8c are completely enclosed by the channel-like grooves 6.

In a design depicted in FIG. 1, the channel-like grooves 6 can be at least partly filled with inserts, such as insert 9. These stripe-shaped inserts 9 then mainly consist of a material (foam) that is comparatively harder than the core part 4.

The channel-like grooves 6 also have the advantage to provide at least partially a good air circulation inside the seat padding 1. The sample shown in FIG. 1 preferably has channel sections 6 running from the area of the ischial tuberosities, i.e. from the grooves 6 enclosing this area, towards the edge, particularly the front edge, of the seat, with their depths gradually decreasing. There are vertical passage openings in the area of the grooves 6 and/or 6a (not visible in the drawing).

It is also advantageous to provide the foam core part 4 with an overlay 10—partly cut away in FIG. 1—at least in an area covering the grooves 6. This overlay 10 preferably consists of a rough, air-permeable fiber/binding-agent material (rubber hair).

The core part 4 itself preferably consists of PUR cold foam.

The entire seat padding 1 is covered with an appropriate cover material 12.

Figure 4:
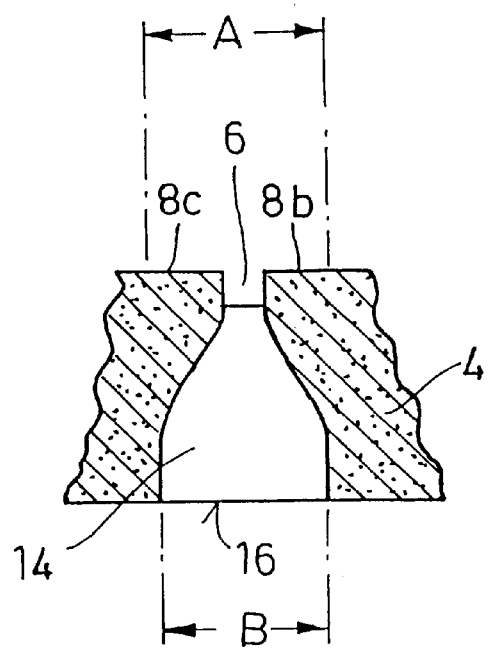
FIG. 4 shows a schematic section IV—IV indicated in FIG. 2.

Another preferred design of the seat padding 1 as described by this invention is illustrated in FIGS. 2 to 4. These figures show the same parts or components with the same reference numbers as in FIG. 1. This seat part is designed as a ventilation seat in which a main channel 14 originating from the bottom side opposite to the seat surface 2 runs through the core part 4 upwards to blend into the channel-like grooves 6. A fan 18 (see FIG. 5) can be attached in the area of the lower port opening 16 such that an airflow is produced through the seat padding 1. In principle, any direction of the flow can be chosen, however, it should be preferably from bottom to top.

The main channel 14, in the area of its lower port opening 16, has a predominantly circular channel section, adapted to the flow section of the fan 18, that gradually blends into the grooves 6 on the top of the core part 4 through an oblong, slit-like transition section, while preferably maintaining an approximately constant overall section area. The essentially constant section area along the channel path ensures an even airflow. As can be seen in FIGS. 3 and 4, the lower port opening 16 of the main channel 14 is located approximately in the area below the partial surfaces 8b and 8c provided as supporting elements for the human ischial tuberosities. Preferably the section width B or the diameter of the lower port opening 16 is smaller than the average distance A of the human ischial tuberosities. As this average distance A is approximately 100 mm, the section width B is preferably about 80 mm. This ensures that the material of the core part 4 is located with its entire height directly vertically below the ischial tuberosities resulting in a high support effect. Thanks to the special shape of the main channel 14 shown in FIG. 4, the core part 4 becomes only approximately 8% softer (than without a channel) in this seat area, which can, however, be compensated adequately by the foam quality and/or the overlay 10.

In the design version as a ventilation seat, it is advantageous to provide the channel-like grooves 6 on the top side with smooth shapes to optimize the airflow.

Figure 5:
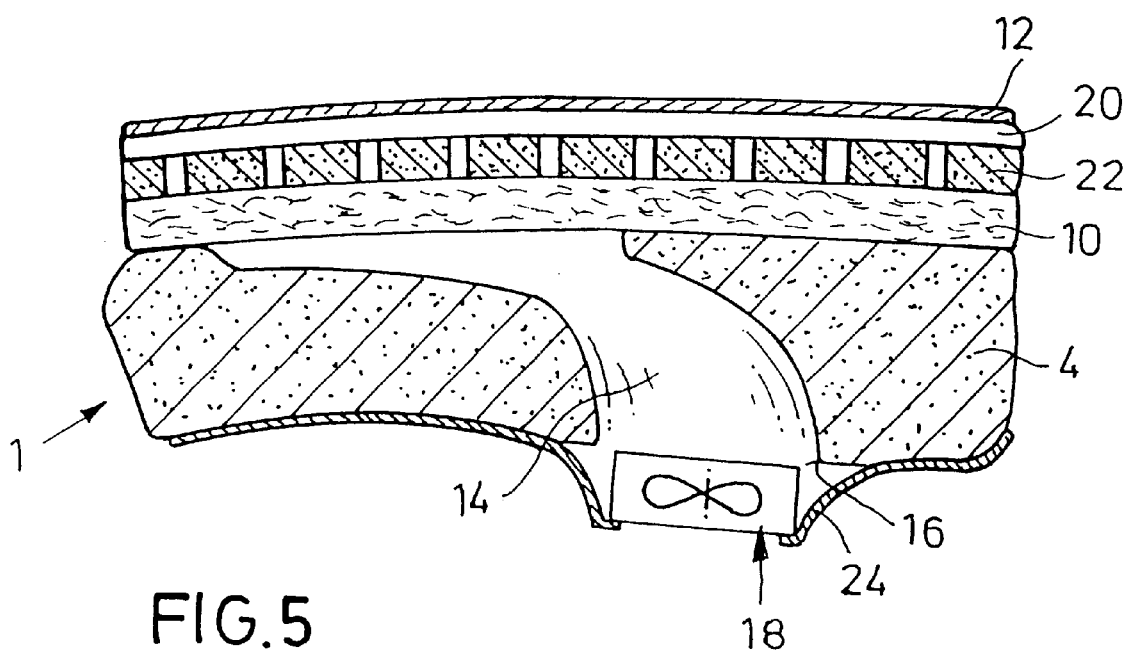
FIG. 5. shows a longitudinal section through the seat padding having an effective design.

FIG. 5 finally illustrates some additional advantageous design features. For example, a seat surface heating could be provided, especially in the form of an air-permeable surface heating element 20 covering the core part 4. This could be a so-called carbon layer heating that is preferably located between an additional hole foam layer 22 on top of the panel 10 and the cover 12. The core part 4 is supported by a rigid lower seat pan 24 that should practically also contain the fan 18.

The invention is not confined to the depicted and described design samples, but encompasses also all other designs having the same effects which are the subject of this invention. One skilled in the art will readily recognize from such discussion, and from the accompanying drawings and claims, that changes and modifications can be made to the invention without departing from the true spirit and fair scope of the invention as defined in the following claims.

I claim:

1. Seating paddings in particular for vehicle seats, comprising:

a core part made of plastic foam, wherein said core part's top surface facing a seat surface is interrupted by grooves wherein the grooves are at least partly filled with inserts which are made of a material that is comparatively harder than said core part, wherein the grooves form channel-like grooves and a number of resulting remaining partial surfaces of the core part are geometrically adapted to the human anatomy in the seating area to obtain an optimal seat pressure distribution, wherein two partial surfaces are completely enclosed by the channel-like grooves providing supporting elements to support the human ischial tuberosities.

2. The seat paddings of claim 1, wherein said channel-like grooves allow at least a partial air circulation.

3. The seat paddings of claim 1, wherein said core part is covered by an overlay at least in the area of said grooves wherein said overlay is made of a rough, air-permeable fiber/binding-agent material.

4. The seat paddings of claim 1, further comprising a main channel running from the bottom opposite side seat surface through said core part blending into said channel-like grooves, and further comprising a fan located in the area of a lower port opening within said main channel.

5. The seat paddings of claim 4, wherein said main channel has a predominately circular channel section in the area of said lower port opening that is adapted to a flow section of said fan and smoothly blends into said grooves through an oblong, slit-like section, preferably while maintaining an approximately constant overall section area.

6. The seat paddings of claim 5, where said lower port opening of said main channel is located approximately in the area below said partial surfaces provided as supporting elements for the human ischial tuberosities, with the section width of said lower port opening being smaller than approximately one hundred millimeters.

7. The seat paddings of claim 3, wherein said core part is covered by said overlay consisting of an air-permeable material.

8. The seat paddings of claim 1, further comprising a seat surface heating element, particularly in the form of an air-permeable area heating element covering said core part.

* * * * *